United States Patent [19]

Lowry et al.

[11] 4,441,455
[45] Apr. 10, 1984

[54] TEAT CUP STOPPER

[76] Inventors: Gary H. Lowry, 2700 Buford Hwy., Atlanta, Ga. 30324; John A. Simmons, Rte. 4, Box 144, Pontotoc, Miss. 38863

[21] Appl. No.: 377,957

[22] Filed: May 13, 1982

[51] Int. Cl.³ .................................................. A01J 5/00
[52] U.S. Cl. .................................. 119/14.47; 215/349; 215/363
[58] Field of Search ............... 119/14.47, 14.48, 14.49, 119/14.5, 14.51, 14.52, 14.53; 215/292, 317, 322, 349, 354, 363

[56] References Cited

U.S. PATENT DOCUMENTS 1,162,519 11/1915 Schuster ............................... 215/363
1,630,805 5/1927 Schuster ............................... 215/363
3,362,280 1/1968 Muller .............................. 215/317 X

FOREIGN PATENT DOCUMENTS 610301 10/1948 United Kingdom ............. 119/14.47
1019316 2/1966 United Kingdom ................ 215/349

Primary Examiner—Robert P. Swiatek
Attorney, Agent, or Firm—Harry I. Leon; V. L. Leon

[57] ABSTRACT

A closure for a teat cup with a resilient inner liner in the shape of a small disk with a centrally located bulge. A farmer who has to milk fewer than four teats on any cow because of injury to or disease in one of them can utilize the closure to adapt an automatic milking machine of the conventional type to harvest her milk. The disk is large enough to cover the opening in the teat cup liner otherwise provided for the reception of a teat so that the flow of air therethrough can be cut off when a vacuum is applied to the passageway which terminates in this opening. The bulge with its gently sloping, raised surface increases the area of contact between the disk and the lip of the liner to aid in sealing the disk to the cup under vacuum conditions and prevents the disk from slipping sideways. A magnet secured to the back side of the closure, opposite the bulge, facilitates storage.

9 Claims, 5 Drawing Figures

TEAT CUP STOPPER

BACKGROUND OF THE INVENTION

1. Field of the Invention

This invention relates to blocking the flow of air through the central passageway of an unused teat cup when a vacuum is applied thereto, the teat cup being fluidly connected to one or more of the remaining teat cups of a milking machine.

2. Description of the Prior Art

Prior to milking a cow with an automatic milking machine, her teats are inserted into the resilient liners of the teat cups with one teat occupying each cup. The teat-receiving central passageways of these liners are fluidly interconnected so that a vacuum can be applied sumultaneously at the end of each teat, permitting milk to flow to a milk receiver. A resilient liner is used so that this vacuum action can be shut off intermittently by applying a pulsating vacuum to the annular space between the liner and the hard outer shell of the teat cup, thereby aiding in the milking operation.

Occasionally, one of a cow's teats, due to disease, excessive medication, or injury, cannot be milked. Typically, two or three cows in every 30 have at least one such teat which, if it were milked automatically with the others, would contaminate the entire milk supply. When only three teat cups of a miling machine can be employed, the flow of air through the liner of the fourth unused teat cup must be shut off. Otherwise, a vacuum cannot be held on the teat cups in service; and they fall from the animal to the floor. To shut off this flow of air, diarymen in the past have resorted to kinking the section of vacuum hose connected to the stem of the unused teat cup. But this approach damages the hose which, being very stiff, must be twisted considerably to stop the flow of air. Further, a diaryman must constantly watch each cow having a kink in one of these hoses during a milking operation since a kink can be readily lost when she kicks or moves about.

SUMMARY OF THE INVENTION

In the subject invention, a closure comprising a self-centering, rigid disk is positioned on the lip of the resilient liner of a teat cup to form a seal with the lip under vacuum conditions, thereby permitting a dairyman to milk a cow with three or fewer healthy teats without having to kink a vacuum hose in the milking machine or constantly watch the cow. A portion of the closure which is adapted to extend over the edge of the lip and into the central passageway of the liner comprises a means for centering the disk with respect to the opening which is otherwise used for receiving a cow's teat. This centering means includes an approximately symmetrical bulge which projects from the surface of the disk, the bulge and the disk comprising a single, unitary piece formed of plastic. The circumference of the base of the bulge is generally equal to that of the opening in the central passage, thereby preventing the closure from slipping sideways when a cow kicks.

The diameter of the disk which extends radially from the bulge in all directions is limited to a narrow range of values. The span of the disk must be sufficient to prevent the closure from being drawn into the openings of the central passageway under vacuum conditions, so that the closure can be readily removed by an operator using only his hands; but at the same time, the disk cannot extend over the side of the liner. The latter restriction is necessary to eliminate the possibility of the closure being knocked off accidentally as the cow is being milked. Closures of different disk diameters are provided so that teat cups from various manufacturers can be adapted for use in harvesting the milk of a cow with fewer than four healthy teats.

The closure further comprises a means for suspending the disk from a pipe or the like, the suspending means being disposed on the side of the disk opposite the bulge. The suspending means includes a magnet of cylindrical shape which is rigidly secured to the disk and partially disposed within a shallow depression formed in the disk on the concave side of the bulge.

BRIEF DESCRIPTION OF THE DRAWINGS

Further details are explained below with the help of the examples illustrated in the attached drawings in which.

DESCRIPTION OF THE PREFERRED EMBODIMENT

Figure 3:
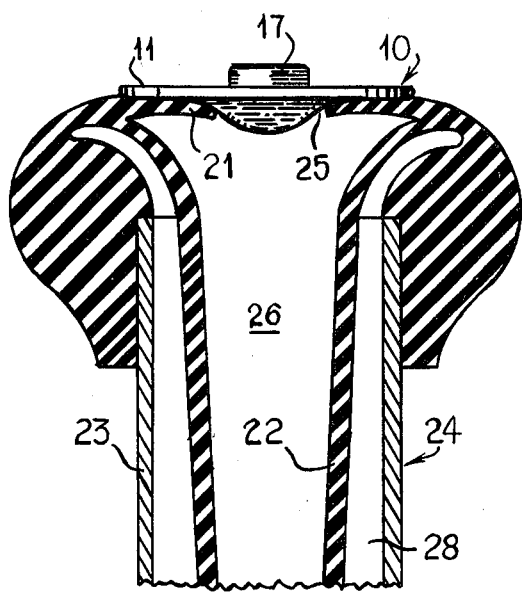
FIG. 3 is an elevational view of the embodiment shown in FIG. 1 in which it is positioned on the lip of an inner liner mounted within a simplified teat cup, the liner and the cup being illustrated in a fragmentary, cross-sectional view.

In the drawings, a closure 10 in accordance with the present invention is shown positioned on the lip 21 of a simplified teat cup 24. As illustrated in FIG. 3, the cup 24 has a rubber inner liner 22 mounted in a hard outer shell 23; this construction is similar to that shown in U.S. Pat. No. 4,141,319. But the closure 10 can be used with any cup having an opening for receiving a teat in which the opening is formed in the lip of a resilient liner.

In the closure 10, there is provided a disk 11 with a centrally located bulge 15. The disk 11 and the base of the bulge 15 each have a periphery of generally circular shape. The base with its diameter approximating that of a cow's teat fits snugly within the opening 25 to create a better vacuum seal than would be possible in the absence of the bulge 15. It also insures that the closure 10 can be positioned quickly and easily by an operator on the lip of the liner 22. Moreover, the bulge 15 keeps the closure 10 centered with respect to the longitudinal axis of the shell 23 and prevents the closure 10 from slipping sideways when the cow kicks or moves about.

In the preferred embodiment seen in FIG. 3, the disk 11 extends over the sides of the shell 23 just far enough to provide an edge so that the closure 10 can be dislodged from the cup 24 by an operator using only his hands. If the diameter of the disk is too small, it and a portion of the lip 21 are pulled a short distance into the cup 24 when a vacuum is applied to the passageway 26, thereby making removal of the closure from the cup 24 difficult. On the other hand, if the disk 11 extends over the outer edge of the liner 22, the closure can be knocked off easily by the movements of the cow being milked.

The inclusion of a means of centering the closure 10 with respect to the shell 23 such as the bulge 15 is necessary when the diameter of the disk 11 is equal to or larger than that of the shell 23. Otherwise, the disk would slip sideways from the teat cup 24 since there would be little resistance to such motion during each of the intervals, typically about one second in duration, when the vacuum within the annular space 28 is intermittently shut off as the milking machine (not shown) is being operated.

Figure 1:
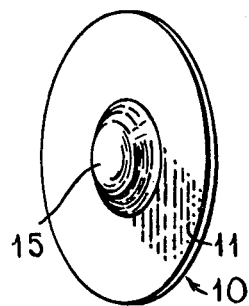
FIG. 1 is a perspective view of one embodiment of the present invention.
Figure 2:
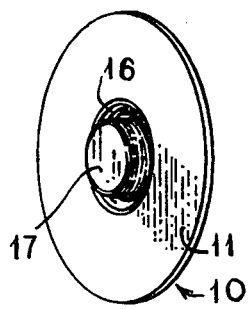
FIG. 2 is another perspective view of the embodiment shown in FIG. 1.

The disk 11 and the bulge 15 comprise a single piece formed of a suitable material having a slick, non-stick surface, such as polyethylene, acrylic, or the like. Further, if this material is colored red or white, an operator will be aided in locating the closure 10 and in retrieving it from storage. The thickness of the disk 11 must be sufficient for it to withstand one atmosphere of pressure. Such a thickness for a disk of acrylic is, by way of example, approximately 3/32 inch. The piece comprising the disk 11 and the bulge 15 may be fabricated from a circular section of a thermoplastic material by first centering it over a hole formed in a planar surface of an airtight chamber, then heating the section until it becomes softened, and finally applying a vacuum to the chamber, thereby drawing a portion of the section inwardly to create the bulge 15 and, simultaneously, a depression 16 (FIGS. 1 and 2). In the preferred embodiment, the bulge 15 so created measures approximately 5/32 inch in height above the disk 11 and has an approximately ⅛ inch diameter at its base. Two different sizes in the diameter of the disk 11 itself are provided: one which is approximately 2 inches across; the other 2⅛ inches. These two sizes are required to fit the teat cups of different manufacturers properly.

Figure 4:
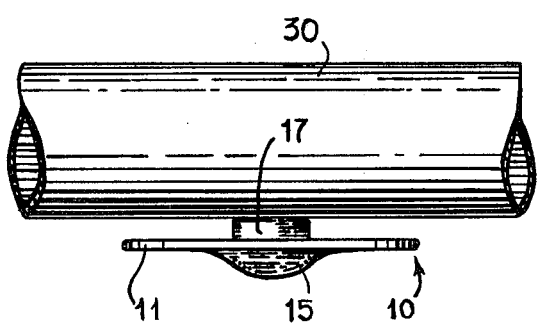
FIG. 4 is a plan view of the embodiment shown in FIG. 1 in which it is suspended beneath a pipe, a fragmentary portion of which is depicted.

As is best seen in FIG. 4, a small magnet 17 of sufficient strength to hold the closure 10 in contact with a ferromagnetic surface 30 projects from the side of the disk 11 opposite the bulge 15. The magnet 17, which is rigidly attached to the closure 10 by glue, is mounted within the depression 16 to minimize its outward extension from the disk 11 and to reduce the likelihood of its ever snagging upon a foreign object. Alternately, the magnet 17 may be secured to the closure 10 by mechanical means such as a rivet (not shown) embedded in the depression 16. Since pipes or bars formed of ferromagnetic material are commonly employed in constructing milking stalls, the magnet 17 provides a means for suspending the closure 10 from a variety of sites convenient to a milking operation.

Figure 5:
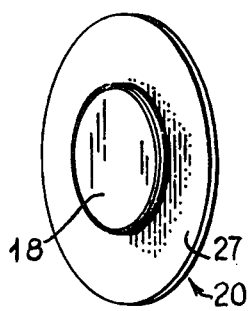
FIG. 5 is a perspective view of a further embodiment of the present invention, the view being taken from the same side of the disk as in FIG. 2.

FIG. 5 illustrates a further embodiment of the closure in which the magnet 17 has been replaced by a thinner magnet 18 which is preferably ⅛ inch or less in thickness. The magnet 18 may be formed of a flexible permanent magnetic strip affixed by adhesive to the disk 27. In such an embodiment, the thickness of the magnet 18 measures, by way of example, approximately 1/16 inch. Instead of being mounted within a depression, the magnet 18 is rigidly attached to the disk 27 of the closure 20 which is formed without any depression.

Alternately, the means for suspending the closure 20 and the disk 27 may comprise a single, unitary piece formed of a material having magnetic properties such as ceramic, plastic, rubber or the like in which are embedded fine magnetic particles.

Because a closure including a magnet is readily cleaned and can be suspended from any ferromagnetic surface without prior modification thereof, such a closure is preferred. But mechanical fasteners can be used instead of a magnet in suspending the closure provided they do not protrude or protrude at most a short distance from the disk of the closure. Examples of such fasteners include Velcro material affixed to the side of the closure opposite the bulge 15 with a corresponding Velcro fastener secured to a site in the milking stall and a partially closed depression (not shown) on the side of the disk opposite the bulge so that the edge of the depression can be caught on a hook mounted in the stall.

What is claimed is:

1. A closure for an unused teat cup of the type wherein a resilient liner with an outer lip is mounted within a hard outer shell of generally cylindrical shape proximate the lip and wherein the liner and said lip have a central passageway and an opening, respectively, which communicate with each other, comprising:

(a) a disk of sufficient area to cover the opening; and
   (b) a downwardly tapering projection which is rigidly attached to the disk with the positions of the disk and of the projection being fixed with respect to each other, the projection being adapted to extend over the edge of the lip and into the central passageway of the liner when the disk is in position to cover the opening thereto, the greatest dimension of the opening and of a cross-section of the projection which is disposed generally parallel to the disk being generally equal so that said projection is not distorted upon insertion into said opening, said cross section thereby preventing the closure from slipping off the lip once the projection is positioned within the opening, so that a vacuum can be held within the passageway, facilitating the use of other teat cups fluidly connected thereto during a milking operation.

2. A closure according to claim 1 wherein the projection is further characterized as being disposed generally symmetrically about the center of mass of the disk, said cross-section of the projection being generally equal in circumference to the opening in the lip, so that the projection fits snugly therein to block the flow of air therethrough when a vacuum is applied to the central passageway.

3. A closure according to claim 2 wherein the outer periphery of the disk is further characterized as being generally circular, the radius of curvature thereof being at least as great as the inner diameter of the portion of the shell proximate the lip, so that the closure can be readily removed by an operator using only his hands during a milking operation.

4. A closure for an unused teat cup of the type wherein a resilient liner with an outer lip is mounted within a hard outer shell and wherein the liner and said lip have a central passageway and an opening, respectively, which communicate with each other, comprising:

a disk and a projection having a raised surface with gently sloping sides which rise from the disk and which are adapted to extend over the edge of the lip and into the central passageway of the liner; the greatest dimension of each cross-section of the projection which is disposed generally parallel to the disk decreasing with the distance of said cross-section from the disk; the greatest dimension of the largest of said cross-sections being substantially larger than the greatest dimension of said opening in the lip, so that when the closure covers the opening, the surface area of the interface between the lip and portions of the disk and of the projection is large to aid in sealing the lip to the closure under vacuum conditions, thereby facilitating the use of other teat cups fluidly connected to the unused teat cup during a milking operation.

5. A closure according to claim 4 wherein the disk and the projection comprise a single, unitary piece formed of rigid plastic in which the positions of the disk and of the projection are fixed with respect to each other.

6. A closure according to claim 4 which further comprises a means for suspending the disk from a ferromagnetic surface, thereby facilitating the storage of the closure at a variety of sites convenient to a milking stall.

7. A closure for an unused teat cup of the type wherein a resilient liner with an outer lip is mounted within a hard outer shell of generally cylindrical shape proximate the lip and wherein the liner and said lip have a central passageway and an opening, respectively, which communicate with each other, comprising:
   (a) a disk of sufficient area to cover the opening;
   (b) a projection which is rigidly attached to the disk and which is adapted to extend over the edge of the lip and into the central passageway of the liner when the disk is in position to cover the opening thereto, the greatest dimension of the opening and of a cross-section of the projection which is disposed generally parallel to the disk being approximately equal, thereby preventing the closure from slipping off the lip once the projection is positioned within the opening, so that a vacuum can be held within the passageway, facilitating the use of other teat cups fluidly connected thereto during a milking operation;
   (c) the disk having a depression which is formed on the face of the disk opposite the projection; and
   (d) means for suspending the disk from a ferromagnetic surface, thereby facilitating the storage of the closure at a variety of sites convenient to a milking stall, the suspending means having a magnet which is partially disposed within the depression and rigidly secured thereto, so that the outward extension of the magnet is minimized, thereby reducing the likelihood of the magnet ever snagging upon a foreign object while the closure is in use.

8. A closure for an unused teat cup of the type wherein a resilient liner with an outer lip is mounted within a hard outer shell and wherein a central passageway formed in the liner communicates with an opening in the lip, which comprises:
   (a) a disk of sufficient area to cover the opening;
   (b) a bulge which is disposed generally symmetrically about the center of mass of the disk, the base of the bulge being approximately equal in circumference to the opening in the lip, so that the bulge fits snugly therein to block the flow of air therethrough when a vacuum is applied to the passageway;
   (c) a depression which is disposed on the side of the disk opposite the bulge;
   (d) the disk, the bulge, and the depression comprising a single, unitary piece formed of plastic; and
   (e) a means for suspending the disk when it is not in use from a structure convenient to the milking stall, the suspending means being partially disposed within the depression, so that the outward extension of the suspending means relative to the proximate face of the disk is reduced and with it the likelihood of the suspending means becoming snagged upon a foreign object while the closure is in use.

9. A closure according to claim 8 wherein the suspending means further comprises a magnet which is rigidly secured within the depression.

* * * * *